April 2, 1963  J. VACCARO, JR  3,083,908
READOUT MECHANISM
Filed March 30, 1960  2 Sheets-Sheet 1

INVENTOR.
JOSEPH VACCARO, JR.
BY
AGENT

April 2, 1963   J. VACCARO, JR   3,083,908
READOUT MECHANISM
Filed March 30, 1960
2 Sheets-Sheet 2
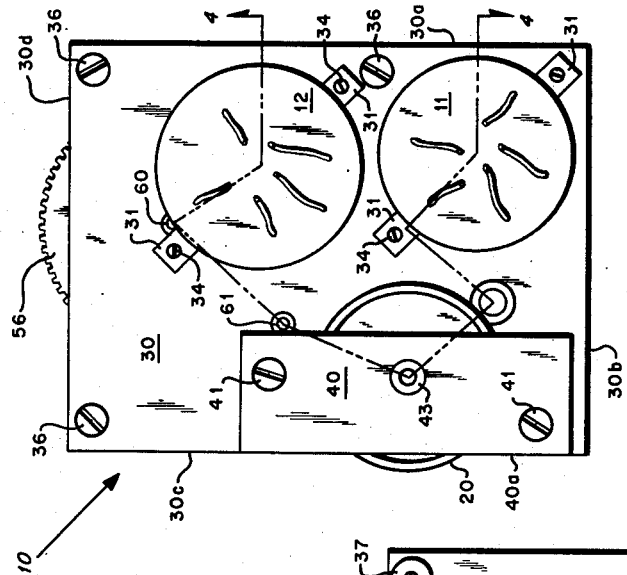
Fig. 3
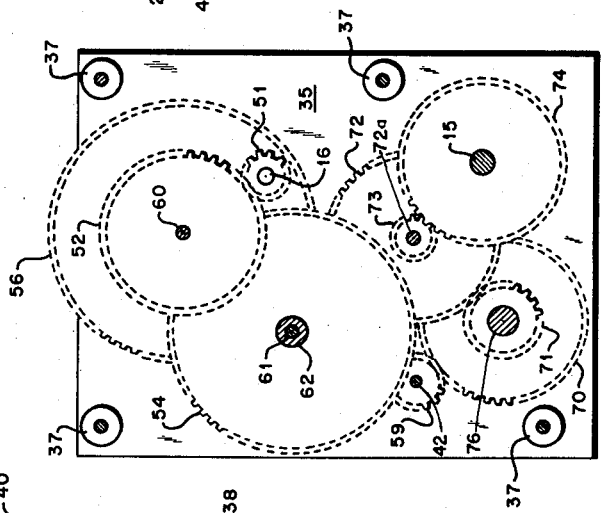
Fig. 5
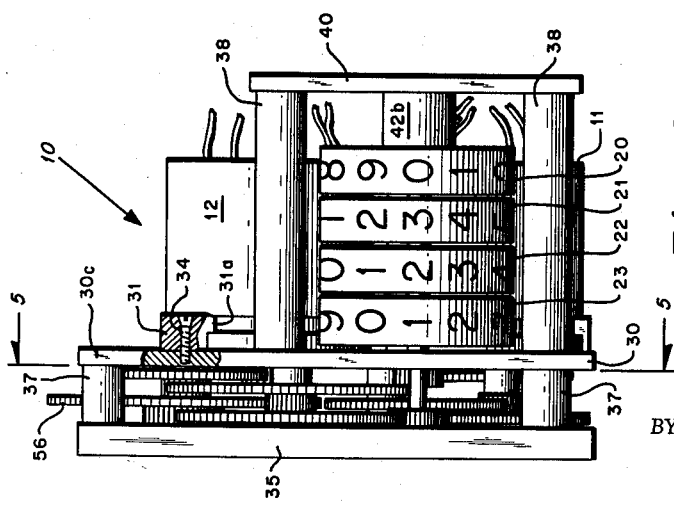
Fig. 2
INVENTOR.
JOSEPH VACCARO, JR.
BY 
AGENT United States Patent Office 3,083,908
Patented Apr. 2, 1963

1

3,083,908
READOUT MECHANISM
Joseph Vaccaro, Jr., Springfield, Pa., assignor to the United States of America as represented by the Secretary of the Navy
Filed Mar. 30, 1960, Ser. No. 18,784
4 Claims. (Cl. 235—92)
(Granted under Title 35, U.S. Code (1952), sec. 266)

The invention described herein may be manufactured and used by or for the Government of the United States of America for governmental purposes without the payment of any royalties thereon or therefor.

The invention relates to a readout mechanism and more particularly to a readout mechanism for indicating numerical data.

One of the principal objects of the invention is the provision of a novel readout mechanism comprising a plurality of readout counter wheels for indicating digital information transmitted to a synchro receiver having an output adapted to drive the counter wheels via self nulling synchronous motor drive means.

Another object of the invention is the provision of a novel synchronous motor driven readout counter mechanism which is ont only lightweight and compact, but in which the counters are connected together in such a manner as to indicate numerical data, such as units of tens, hundreds, and thousands in Arabic numerals.

Another object of the invention is the provision of a novel readout mechanism driven by a synchronous motor which forms a part of a self-nulling synchro system, the mechanism forming a compact, lightweight box-shaped package which can be installed or removed as a single unit.

A still further object of the invention is the provision of a novel readout mechanism, as set forth in preceding objects, which is easily maintained and the parts thereof are each easily removable for inspection and/or replacement.

Yet another object of the invention is the provision of a novel readout mechanism, as set forth in the preceding objects, which is economical to manufacture and contains only a minimum of easily manufactured, interchangeable, and simple parts.

A still further object of the invention is the provision of a novel readout mechanism comprising readout counter wheels having Arabic indicia thereon and driven by a synchro motor through a gear train, a control transformer utilized as a synchro receiver exciting the synchro motor and the rotor thereof being driven to a null position via a gear train driven by the motor, and the entire readout mechanism being embodied as a single, compact box-shaped unit which is easily removable and has the advantageous characteristics pointed out in preceding objects.

The invention further resides in certain novel features of construction, combinations, and arrangements of parts, and further objects and advantages of the invention will be apparent to those skilled in the art to which it pertains from the following description of the preferred embodiment thereof, described with reference to the accompanying drawings in which similar reference characters represent corresponding parts throughout the several views, and in which:

FIG. 2 is a top plan view of the structural configuration of the device embodying the invention;

FIG. 3 is an end view of FIG. 2;

FIG. 5 is a sectional view along line 5—5 in FIG. 2.

2

Figure 4:
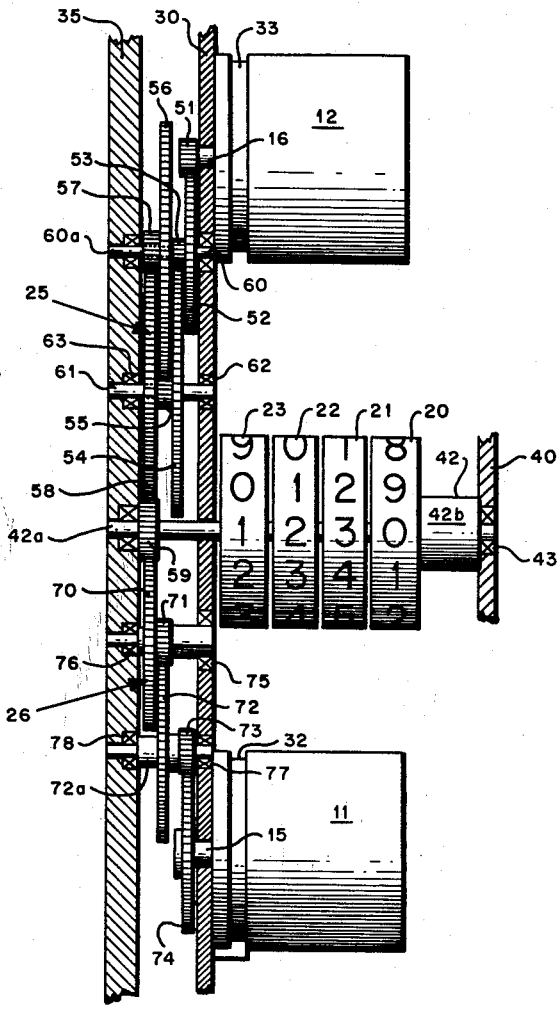
FIG. 4 is a sectional view along line 4—4 in FIG. 3.

It is to be understood that the invention is not limited to the details of construction and arrangement of parts shown in the drawings and herein described in detail, but is capable of being otherwise embodied and practiced or carried out in various ways. It is to be further understood that the phraseology or terminology employed herein is for the purpose of description and there is no intention to herein limit the invention beyond the requirements of the prior art.

Figure 1:
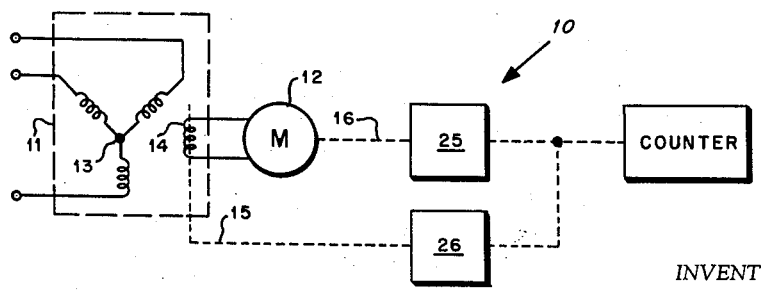
FIG. 1 is a schematic electromechanical diagram illustrating a device embodying the invention.

Referring to FIG. 1, the invention is shown embodied in a readout mechanism, indicated generally by reference numeral 10. The readout mechanism 10 comprises a control transformer indicated generally by the reference numeral 11, functioning as a synchro receiver. A synchronous motor 12 is adapted to be excited by the signal output of the synchro receiver 11. The synchro receiver 11 comprises a Y-shaped primary winding 13 and a secondary winding or rotor coil 14 mounted on a rotor shaft 15. The primary winding 13 is adapted to be connected back-to-back with a Y-shaped secondary winding of a synchro transmitter, not shown, which transmitter can be remotely located for transmitting digital or numerical data or information to the synchro receiver 11. The secondary winding 14 is electrically connected to excite the synchronous motor 12. The motor 12 is preferably driven from a 400 cycle, 26 volt alternating current power source. Also, if deemed necessary or desirable, an amplifier can be used with its input connected across the secondary winding 14 and its output adapted to excite the synchronous motor 12. The synchronous motor 12 has an output shaft 16 adapted to drive a plurality of interconnected counter wheels 20, 21, 22 and 23 by means of a gear train, indicated generally by the reference numeral 25. Preferably, the gear train 25 has a gear reduction ratio of 500:1. The counter is geared so that 360 degrees of synchro motor shaft rotation is equivalent to 60 minutes of time where the counter is being used as a time-to-go mechanism. Preferably, the counter reads to the nearest tenth of a minute. The details of the counter wheels 20, 21, 22, 23 are not shown as the details thereof are conventional. More particularly, one rotation of the counter 20 will rotate the counter 21 through 36 degrees and full rotation of the counter 21 will in turn drive the counter 22 through 36 degrees. Similarly, a full revolution of the counter 22 will drive counter 23 through 36 degrees.

The output of the synchro receiver 11 is nulled or driven to a null position by means of a gear train, indicated generally by reference numeral 26, driven by the synchronous motor 12. More particularly, the gear train 26 drives the rotor shaft 15 to a null position relative to the primary winding 13. Preferably, the gear train 26 has a gear reduction ratio of 60:1.

The counter wheels shown in FIGS. 1, 2 and 4, each has indicia of 0, 1, 2, 3, 4, 5, 6, 7, 8, 9 fixed, engraved, printed or otherwise appearing thereon at 36 degree intervals. However, it is to be understood that other indicia can be used as appropriate or desired.

Referring to FIGS. 2, 3 and 4, the synchro receiver 11 and motor 12 each has a cylindrical housing and is mounted upon a support panel or wall 30 by means of wedge-shaped clamps or dogs 31, which have a flange or lip portion 31a extending into peripheral grooves 32 and 33 in the synchro receiver 11 and the motor 12, respectively. The clamps 31 are held to the panel 30 by means of screws 34. It is understood that other fastening means, other than screws 34, can be used if desired. The receiver 11 and the motor 12 are each held in place by means of two diametrically oppositely disposed clamps 31. The shafts 15 and 16 of the receiver 11 and motor 12, respectively, extend through the panel 30 adjacent the right edge 30a of the panel 30, FIG. 3. The axes of the shafts 15 and 16 lay in a plane which is within five degrees of being parallel to the side 30a and thus may be considered to be substantially parallel to side 30a. The panel 30, as best seen in FIG. 3, is rectangular and preferably measures 3⅛ x 3¾ inches. The panel 30 is fastened to a base plate or wall 35 by means of screws 36, FIG. 3, threaded into four interconnecting cross members 37. The panel 30 is mounted in parallel relationship with the wall 35. Cross members 38 are provided to support a counter mounting plate 40 in parallel relationship to the panel 30 and the wall 35. Two screws 41 are used to fasten the counter mounting plate 40 to the members 38. The counter wheels 20, 21, 22, 23 are mounted on a shaft 42 of which a drive shaft portion 42a is journaled in the base plate 35 and the wall 30 and the opposite end 42b of the shaft 42 is journaled in the counter mounting plate 40. Anti-friction bearings 43 and 44 are respectively adapted to rotatably mount the shaft portion 42b in the counter mounting plate 40 and the shaft portion 42a in the base plate 35. The counter mounting plate 40 is substantially rectangular and has one edge 40a coplanar with the left hand edge 30c of the panel 30, FIG. 3. Preferably, the plate 40 is approximately 1 x 2½ inches in size. The lower edge 40b of the plate 40 is closely adjacent to and parallel with the lower edge 30b of the panel 30.

The gear mechanism 25 is comprised of gears 51, 52, 53, 54, 55, 56, 57, 58 and 59. The drive shaft 16 of the motor 12 is fixed to and drives spur gear 51 which in turn is enmeshed with and drives gear wheel 52. The gear wheel 52 is journaled on a shaft 60 having its ends conventionally journaled in the walls 30 and 35. The gear 53 is fixed to and driven by the gear 52 and is enmeshed with and drives gear wheel 54. The gear wheel 54 is rigidly mounted on a counter shaft 61 which is journaled in walls 30 and 35 by means of bearing sleeves 62 and 63, respectively. A small spur gear 55 is coaxially fixed to gear wheel 54 and is enmeshed with and drives a gear wheel 56. The wheel 56 is journaled on a reduced end portion 60a of the shaft 60. Fixed to the gear wheel 56 is a small gear wheel 57 which meshes with and drives the gear 58. The gear 58 is journaled on the shaft 61. The gear 58 acts as an idler gear and drives a small spur gear 59, which is fixed to the counter drive shaft 42 for driving the counter wheels 20, 21, 22, 23 in the manner described hereinbefore.

The gear mechanism 26, which is driven by the gear wheel 59 mounted on the counter mechanism shaft 42, drives the rotor shaft 15 of the receiver 11 to a null position at a ratio of 60:1 and comprises gears 70, 71, 72, 73 and 74. The gear 59 is enmeshed with the gear 70 mounted on a counter shaft journaled in the walls 30 and 35 respectively by means of journal sleeve bearings 75 and 76. The gear wheel 70 is fixed to and drives a small coaxial gear 71, which in turn drives another gear wheel 72. The wheel 72, like the gear 70, is independently journaled in the walls 30 and 35. Journal bearings 77 and 78 are shown mounted in the walls 30 and 35 for journalling the gear wheel 72, FIG. 4. The gear wheel 72 is coaxial with and fixed to its own journal shaft 72a. Also fixed to the journal shaft 72a is the smaller gear 73 which meshes with a gear 74. The gear 74 is fixed to and drives the rotor shaft 15 which carries the secondary winding 14 of the receiver 11.

Accordingly, the motor 12 drives the counter wheel shaft 42 for indexing the counters 20, 21, 22 and 23 through the gear train 25. Simultaneously with the driving of the shaft 42, the receiver rotor 15 is driven by the gear 59 on the counter wheel shaft.

Although it is recognized that other gear combinations can be provided, the gear train 25 is provided with gears having a ratio of $$\frac{75}{15} \times \frac{120}{12} \times \frac{120}{12} = 500:1$$

The gear train 26 is provided with gears having a ratio of $$\frac{84}{21} \times \frac{84}{21} \times \frac{75}{20} = 60:1$$

Referring to FIG. 5, the centers of the gears 74, 73, 71, 59, 54, 52 and 51 when connected by straight lines form a heptagon confined within the perimeter of the panel 30. All gears are confined within the perimeter of the panel 30 with the exception of the idler gear 56 which extends beyond the upper edge 30d of the panel 30. The counter wheels 20, 21, 22, 23 extend beyond the edge 30c of the panel 30 and accordingly can be advantageously positioned close to, and if desired, within a viewing window of a housing, not shown, for clear and unobstructed observation. The gearing for driving the counter wheel shaft 42, and more particularly, the centers of the gears 51, 52, 54 and 59, when connected by straight lines form a trapezoid. The gearing for driving the rotor shaft 15 of the receiver 11, and more particularly, the centers of the gears 74, 73, 71 and 59 when connected by straight lines forms a Z-shaped figure or a zig-zag line.

While a specific embodiment made in accordance with the invention has been shown and described, it is understood that the invention is susceptible of many changes and modifications, as known to a person skilled in the art, and it is intended to cover all such changes and modifications coming within the scope of the appended claims.

What is claimed is:

1. A readout mechanism comprising, readout counter wheel means having numerical indicia thereon, a shaft carrying said readout counter wheel means thereon, a first plate, a second plate disposed parallel to said first plate, a third plate disposed parallel to said second plate, said counter means shaft having the ends thereof journaled in said first and third plates with said counter wheel means being disposed between said second and third plates, means securing said second plate to said first and third plates, a synchronous motor fixed to said second plate and having a drive shaft extending through said second plate and terminating between said first and second plates, a synchro receiver fixed to said second plate and having a rotor shaft extending through said second plate and terminating between said first and second plates, first, second, third, and fourth shafts each having the ends thereof extending between and journaled in said first and second plates, all of said shafts being parallel and geometrically arranged so as to form a heptagon when the centers of said motor drive shaft, said first shaft, said second shaft, said counter means shaft, said third shaft, said fourth shaft, said synchro rotor shaft and said motor drive shaft are respectively interconnected with continuous straight lines, a first gear fixed to said motor drive shaft, a second gear fixed to said first shaft and driven by said first gear, a third gear coaxially fixed to said second gear, a fourth gear fixed to said second shaft and driven by said third gear, a fifth gear coaxially fixed to said fourth gear, a sixth gear journaled on said first shaft and driven by said fifth gear, a seventh gear fixed to said sixth gear, an eighth gear journaled on said second shaft and driven by said seventh gear, a ninth gear fixed to said counter means shaft and driven by said eighth gear, a tenth gear fixed to said third shaft and driven by said ninth gear, an eleventh gear coaxially fixed to said tenth gear, a twelfth gear fixed to said fourth shaft and driven by said eleventh gear, a thirteenth gear fixed to said twelfth gear, a fourteenth gear fixed to said rotor shaft and driven by said thirteenth gear, said first and second plates being rectangular and of the same dimensions, only said sixth gear and said counter wheel means extending beyond the perimeter of said first and second plates, and said third plate being smaller than said first and second plates and having one side coplanar with corresponding sides of said first and second plates.

2. A readout mechanism comprising, readout counter wheel means having numerical indicia thereon, a shaft carrying said readout counter wheel means thereon, a first plate, a second plate disposed parallel to said first plate, a third plate disposed parallel to said second plate, said counter means shaft having the ends thereof journaled in said first and third plates with said counter wheel means being disposed between said second and third plates, means securing said second plate to said first and third plates, a synchronous motor fixed to said second plate and having a drive shaft extending through said second plate and terminating between said first and second plates, a synchro receiver fixed to said second plate and having a rotor shaft extending through said second plate and terminating between said first and second plates, first, second, third, and fourth shafts each having the ends thereof extending between and journaled in said first and second plates, all of said shafts being parallel and geometrically arranged so as to form a heptagon when the centers of said motor drive shaft, said second shaft, said counter means shaft, said third shaft, said fourth shaft, said synchro rotor shaft and said motor drive shaft are respectively interconnected with continuous straight lines, a first gear fixed to said motor drive shaft, a second gear fixed to said first shaft and driven by said first gear, a third gear coaxially fixed to said second gear, a fourth gear fixed to said second shaft and driven by said third gear, a fifth gear coaxially fixed to said fourth gear, a sixth gear journaled on said first shaft and driven by said fifth gear, a seventh gear fixed to said sixth gear, an eighth gear journaled on said second shaft and driven by said seventh gear, a ninth gear fixed to said counter means shaft and driven by said eighth gear, a tenth gear fixed to said third shaft and driven by said ninth gear, an eleventh gear coaxially fixed to said tenth gear, a twelfth gear fixed to said fourth shaft and driven by said eleventh gear, a thirteenth gear fixed to said twelfth gear, a fourteenth gear fixed to said rotor shaft and driven by said thirteenth gear, said first and second plates being rectangular and of the same dimensions, said counter wheel means partially extending beyond the perimeter of said first and second plates, and said third plate being smaller than said first and second plates and having one side coplanar with corresponding sides of said first and second plates.

3. A readout mechanism comprising, readout counter wheel means having numerical indicia thereon, a shaft carrying said readout counter wheel means thereon, a first plate, a second plate disposed parallel to said first plate, a third plate disposed parallel to said second plate, said counter means shaft having the ends thereof journaled in said first and third plates with said counter wheel means being disposed between said second and third plates, means securing said second plate to said first and third plates, a synchronous motor fixed to said second plate and having a drive shaft extending through said second plate and terminating between said first and second plates, a synchro receiver fixed to said second plate and having a rotor shaft extending through said second plate and terminating between said first and second plates, first, second, third, and fourth shafts each having the ends thereof extending between and journaled in said first and second plates, all of said shafts being parallel and geometrically arranged so as to form a heptagon when the centers of said motor drive shaft, said first shaft, said second shaft, said counter means shaft, said third shaft, said fourth shaft, said synchro rotor shaft and said motor drive shaft are respectively interconnected with continuous straight lines, a first gear fixed to said motor drive shaft, a second gear fixed to said first shaft and driven by said first gear, a third gear coaxially fixed to said second gear, a fourth gear fixed to said second shaft and driven by said third gear, a fifth gear coaxially fixed to said fourth gear, a sixth gear journaled on said first shaft and driven by said fifth gear, a seventh gear fixed to said sixth gear, an eighth gear journaled on said second shaft and driven by said seventh gear, a ninth gear fixed to said counter means shaft and driven by said eighth gear, a tenth gear fixed to said third shaft and driven by said ninth gear, an eleventh gear coaxially fixed to said tenth gear, a twelfth gear fixed to said fourth shaft and driven by said eleventh gear, a thirteenth gear fixed to said twelfth gear, and a fourteenth gear fixed to said rotor shaft and driven by said thirteenth gear.

4. A readout mechanism comprising, readout counter wheel means, a shaft carrying said readout counter wheel means thereon, a first plate, a second plate disposed parallel to said first plate, said counter means shaft having the ends thereof journaled in said first plate with said counter wheel means being secured to said second plate, means securing said second plate to said first plate, a synchronous motor fixed to said second plate and having a drive shaft extending through said second plate and terminating between said first and second plates, a synchro receiver secured to said second plate and having a rotor shaft extending through said second plate and terminating between said first and second plates, first, second, third, and fourth shafts, each having the ends thereof extending between and journaled in said first and second plates, all of said shafts being parallel and geometrically arranged so as to form a heptagon when the centers of said motor drive shaft, said first shaft, said second shaft, said counter means shaft, said third shaft, said fourth shaft, said synchro rotor shaft and said motor drive shaft are respectively interconnected with continuous straight lines, a first gear fixed to said motor drive shaft, a second gear fixed to said first shaft and driven by said first gear, a third gear coaxially fixed to said second gear, a fourth gear fixed to said second shaft and driven by said third gear, a fifth gear coaxially fixed to said fourth gear, a sixth gear journaled on said first shaft and driven by said fifth gear, a seventh gear fixed to said sixth gear, an eighth gear journaled on said second shaft and driven by said seventh gear, a ninth gear fixed to said counter means shaft and driven by said eighth gear, a tenth gear fixed to said third shaft and driven by said ninth gear, an eleventh gear coaxially fixed to said tenth gear, a twelfth gear fixed to said fourth shaft and driven by said eleventh gear, a thirteenth gear fixed to said twelfth gear, and a fourteenth gear fixed to said rotor shaft and driven by said thirteenth gear.

References Cited in the file of this patent
UNITED STATES PATENTS

| | | |
|---|---|---|
| 2,699,542 | Harland | Jan. 11, 1955 |
| 2,751,535 | Kuhnel | June 19, 1956 |
| 2,764,720 | Kelling | Sept. 25, 1956 |